United States Patent
Loi et al.

(10) Patent No.: US 12,182,933 B2
(45) Date of Patent: Dec. 31, 2024

(54) METHODS AND SYSTEMS FOR RENDERING SUBSURFACE SCATTERING

(71) Applicants: Wei Sen Loi, Surrey (CA); Li Li, Vancouver (CA)

(72) Inventors: Wei Sen Loi, Surrey (CA); Li Li, Vancouver (CA)

(73) Assignee: HUAWEI CLOUD COMPUTING TECHNOLOGIES CO., LTD., Gui'An District (CN)

(*) Notice: Subject to any disclaimer, the term of this patent is extended or adjusted under 35 U.S.C. 154(b) by 173 days.

(21) Appl. No.: 18/152,630

(22) Filed: Jan. 10, 2023

(65) Prior Publication Data

US 2024/0233252 A1 Jul. 11, 2024

(51) Int. Cl.
*G06T 15/50* (2011.01)

(52) U.S. Cl.
CPC ........ *G06T 15/506* (2013.01); *G06T 2200/24* (2013.01)

(58) Field of Classification Search
CPC ................ G06T 15/506; G06T 2200/24
See application file for complete search history.

(56) References Cited

U.S. PATENT DOCUMENTS

| 9,013,496 | B2 | 4/2015 | Wang et al. |
| 2009/0226049 | A1* | 9/2009 | Debevec ........... G06T 15/50 382/118 |
| 2020/0380762 | A1* | 12/2020 | Karafin ............ G02B 30/00 |
| 2022/0003671 | A1* | 1/2022 | Ghosh ............ G01N 21/293 |

OTHER PUBLICATIONS

Chiang, Matt Jen-Yuan, Peter Kutz, and Brent Burley. "Practical and controllable subsurface scattering for production path tracing." ACM SIGGRAPH 2016 Talks. 2016. 1-2.
Vicini, Delio, Vladlen Koltun, and Wenzel Jakob. "A learned shape-adaptive subsurface scattering model." ACM Transactions on Graphics (TOG) 38.4 (2019): 1-15.
Randrianandrasana, Joel, Patrick Callet, and Laurent Lucas. "Transfer matrix based layered materials rendering." ACM Transactions on Graphics (TOG) 40.4 (2021): 1-16.

(Continued)

*Primary Examiner* — Jitesh Patel

(57) ABSTRACT

A method and computing system for rendering subsurface scattering are provided. An optical property and a thickness are received for each of a plurality of material layers. A latent space is trained for each of the plurality of material layers. A global transfer matrix is generated for at least one multi-layer material, each of the at least one multi-layer material including an ordered set of material layers selected from the plurality of material layers, by determining a transfer matrix for each adjacent pair of material layers in the ordered set of material layers using the latent space for each material layer in the adjacent pair of material layers, the transfer matrix describing angular and azimuthal reflectance and angular and azimuthal transmittance, and determining the global transfer matrix as a product of the transfer matrices of each adjacent pair of material layers.

20 Claims, 9 Drawing Sheets

(56) References Cited

OTHER PUBLICATIONS

Leonard, Ludwig, Kevin Hoehlein, and Ruediger Westermann. "Learning multiple-scattering solutions for sphere-tracing of volumetric subsurface effects." Computer Graphics Forum. vol. 40. No. 2. 2021.

Hébert, Mathieu, Lionel Simonot, and Serge Mazauric. "Matrix method to predict the spectral reflectance of stratified surfaces including thick layers and thin films." (2015).

Gitlina, Yuliya, et al. "Practical measurement and reconstruction of spectral skin reflectance." Computer Graphics Forum. vol. 39. No. 4. 2020.

Fan, Jiahui, et al. "Neural Layered BRDFs." ACM SIGGRAPH 2022 Conference Proceedings. 2022.

Zheng, Chuankun, et al. "A Compact Representation of Measured BRDFs Using Neural Processes." ACM Transactions on Graphics (TOG) 41.2 (2021): 1-15.

\* cited by examiner

METHODS AND SYSTEMS FOR RENDERING SUBSURFACE SCATTERING

TECHNICAL FIELD

The present disclosure relates to image rendering, and, in particular, to methods and systems for rendering subsurface scattering.

BACKGROUND

Rendering physically based subsurface scattering involves simulating the light transport of incoming light transmitted through the surface of the subject. Incoming light 20 can enter a material and undergo multiple randomized light bounces with particles of the subject (subsurface scattering 24) before the light 28 exits the surface 32 as depicted in FIG. 1 (multiple scattering). Depending on the optical properties and configuration of material layers of a multi-layer material, the depth and spread of light bounces underneath the surface alongside with the decays of light intensity. This results the varying translucency and cloudiness visual effects in subsurface scattering enabled natural and artificial material including human skin, milk, wine, and gemstones.

Not all-natural occurrence and artificial subsurface scattering enabled materials are single layer and these materials commonly formed in layered material with varying optical properties and thickness, particularly human skin which composed of epidermis, dermis and subcutaneous tissue. Rendering high fidelity and photorealistic of multi-layer subsurface scattering require considerations of multitudes variables.

Various approaches exist for rendering subsurface scattering of light. One such approach is the Monte Carlo (MC) subsurface scattering (SSS) method that uses a physically based ground truth based on user-defined multi-layer material structures, including associated optical properties and thickness. It requires a very large number of light samples that bombard the surface, and tracing light transport underneath the surface until these samples exit the surface. The Monte Carlo SSS solution does not guarantee noise-free final rendering images due to large portions of light samples being eliminated during the subsurface scattering and light transport from the surface to reach light sources. This results rendering results that are often noisy at the beginning, with the noise being reduced after a period of time. This approach is computationally expensive, and using it requires significant numbers of light samples to trace light transports both from viewpoint to surface and subsurface scattering. It is more computationally expensive than traditional Monte Carlo rendering method for non-subsurface scattering-enabled materials.

Dipole, multiple, photo beam, Gaussian, Separable, and Burley are diffusion functions reported to simplify the intrinsic subsurface scattering by consolidating a multi-layer structure into a single layer with an arbitrary thickness. These methods are fast and efficient, and provide the convincible final rendering results. The transfer matrix method (TMM), described in Gitlina, Yuliya, et al., "Practical measurement and reconstruction of spectral skin reflectance", Computer Graphics Forum, vol. 39, no. 4, 2020, also known as Kulberka-Munk method, is used in diffusion-based methods to describe a multi-layer material subsurface scattering. The idea is to express the overall reflectance and transmittance of a layered material by computing the reflectance and transmittance of each layer material separately using the transfer matrix method.

These diffusion-based methods provide a generalized approach based on the diffusion function that the light emitted onto a flat surface of an arbitrary thick material, and models the light spread underneath the surface (i.e., the fall off). These simplifications and assumptions result in errors and artifacts in the rendering including overly dark/bright spots, blurred surface details, waxy-alike appearance, and off-color artifacts, as is disclosed in Chiang, Matt Jen-Yuan, Peter Kutz, and Brent Burley, "Practical and controllable subsurface scattering for production path tracing", ACM SIGGRAPH 2016 Talks, 2016, pages 1-2.

Various approaches using a variational autoencoder and decoder (VAE), such as that disclosed in Vicini, Delio, Vladlen Koltun, and Wenzel Jakob, "A learned shape-adaptive subsurface scattering model", ACM Transactions on Graphics (TOG), 38.4 (2019), p. 1-15, and using a conditional variational autoencoder and decoder (CVAE), such as that disclosed by Leonard, Ludwig, Kevin Hoehlein, and Ruediger Westermann, "Learning multiple-scattering solutions for sphere-tracing of volumetric subsurface effects", Computer Graphics Forum, vol. 40, no. 2, 2021, can be used to augment the intrinsic subsurface scattering. In particular, the intrinsic subsurface scattering is augmented with machine learning (ML)-trained subsurface scattering data from the ground-truth Monte Carlo subsurface scattering method to render the appearance of an object being rendered during runtime. These solutions reduce the computational cost and provide better rendering results than diffusion-based solutions.

These ML-based subsurface scattering solutions require a very large data source and time to train the model. These methods carried out by a neural network based on a generalized single layer of arbitrary thickness that is trained to respond to variations in optical properties and geometry of user-defined material layers.

Another general approach instead of using a traditional measured bidirectional scattering distribution function (BSDF) characterizes the scatter of optical radiation from a surface as a function of the angular positions of the incident and scattered beams. The method uses a neural network to train an input material database to yield an output material regardless of the output materials that exist in the input material database, yielding a new material database for the rendering. Examples of this general approach are disclosed by Zheng, Chuankun, et al., "A Compact Representation of Measured BRDFs Using Neural Processes", ACM Transactions on Graphics (TOG), 41.2, 2021, pages 1-15, and by Fan, Jiahui, et al., "Neural Layered BRDFs", ACM SIGGRAPH 2022 Conference Proceedings, 2022.

This last general approach can generally represent two-layer materials, but the bottom layer has to be oblique, making the translucent or subsurface scattering transmission impossible. Further, this approach cannot scale to multi-layer materials.

SUMMARY

The present disclosure describes systems and methods which provide one or more efficient techniques to perform In accordance with a first aspect of the present disclosure, there is provided a computer-implemented method for rendering subsurface scattering, comprising: receiving an optical property and a thickness for each of a plurality of material layers; training a latent space for each of the plurality of material layers; generating a global transfer matrix for at least one multi-layer material, each of the at least one multi-layer material including an ordered set of material layers selected from the plurality of material layers, by: determining a transfer matrix for each adjacent pair of material layers in the ordered set of material layers using the latent space for each material layer in the adjacent pair of material layers, the transfer matrix describing angular and azimuthal reflectance and angular and azimuthal transmittance; and determining the global transfer matrix as a product of the transfer matrices of each adjacent pair of material layers; and storing the transfer matrix for each of the at least one multi-layer material in memory of a computing system.

In some or all examples of the first aspect, the computer-implemented method further includes rendering subsurface scattering in a rendered image using at least one of the transfer matrices.

In some or all examples of the first aspect, the optical property can be a refractive index.

In some or all examples of the first aspect, the computer-implemented method further includes determining a bidirectional scattering distribution function for each of the plurality of material layers using the optical property and the thickness thereof, wherein the training is performed using the bidirectional scattering distribution function.

In some or all examples of the first aspect, the computer-implemented method further includes: determining a bidirectional reflectance distribution function and a bidirectional transmittance distribution function for each of the plurality of material layers; and storing the bidirectional reflectance distribution function and the bidirectional transmittance distribution function for each of the plurality of material layers in memory, wherein the determining of the transfer matrix for each adjacent pair of material layers is based on the bidirectional reflectance distribution function and the bidirectional transmittance distribution function for each of the material layers in the adjacent pair.

In some or all examples of the first aspect, the bidirectional scattering distribution function can be determined using a Monte Carlo subsurface scattering method.

In some or all examples of the first aspect, the Monte Carlo subsurface scattering method can be a ground truth Monte Carlo subsurface scattering method.

In some or all examples of the first aspect, during the receiving of the optical property and the thickness of each of the plurality of material layers, a graphical user interface can be generated to enable specification of the optical property and the thickness for each of the plurality of material layers.

In some or all examples of the first aspect, the computer-implemented method further includes receiving, for each of the at least one multi-layer material, an identification of each of the material layers in the ordered set, and an order of the material layers in the ordered set, via the graphical user interface.

In some or all examples of the first aspect, upon the identification of each of the material layers in the ordered set for one of the at least one multi-layer material, the graphical user interface can present a rendered view of the one of the at least one multi-layer material with subsurface scattering generated using the global transfer matrix.

In accordance with a second aspect of the present disclosure, there is provided a computing system for rendering subsurface scattering, the computing system comprising: one or more processors; a memory storing machine-readable instructions that, when executed by the one or more processors, cause the one or more processors to: receive an optical property and a thickness for each of a plurality of material layers; train a latent space for each of the plurality of material layers; generate a global transfer matrix for at least one multi-layer material, each of the at least one multi-layer material including an ordered set of material layers selected from the plurality of material layers, by: determining a transfer matrix for each adjacent pair of material layers in the ordered set of material layers using the latent space for each material layer in the adjacent pair of material layers, the transfer matrix describing angular and azimuthal reflectance and angular and azimuthal transmittance; and determining the global transfer matrix as a product of the transfer matrices of each adjacent pair of material layers; and store the transfer matrix for each of the at least one multi-layer material in memory of a computing system.

In some or all examples of the second aspect, the machine-readable instructions, when executed by the one or more processors, can cause the one or more processors to generate subsurface scattering in a rendered image using at least one of the transfer matrices.

In some or all examples of the second aspect, the optical property can be a refractive index.

In some or all examples of the second aspect, the machine-readable instructions, when executed by the one or more processors, can cause the one or more processors to: determine a bidirectional scattering distribution function for each of the plurality of material layers using the optical property and the thickness thereof, wherein the training is performed using the bidirectional scattering distribution function.

In some or all examples of the second aspect, the machine-readable instructions, when executed by the one or more processors, can cause the one or more processors to: determine a bidirectional reflectance distribution function and a bidirectional transmittance distribution function for each of the plurality of material layers; and store the bidirectional reflectance distribution function and the bidirectional transmittance distribution function for each of the plurality of material layers in memory, wherein the determining of the transfer matrix for each adjacent pair of material layers is based on the bidirectional reflectance distribution function and the bidirectional transmittance distribution function for each of the material layers in the adjacent pair.

In some or all examples of the second aspect, the bidirectional scattering distribution function can be determined using a Monte Carlo subsurface scattering method.

In some or all examples of the second aspect, the Monte Carlo subsurface scattering method can be a ground truth Monte Carlo subsurface scattering method.

In some or all examples of the second aspect, the machine-readable instructions, when executed by the one or more processors, can cause the one or more processors to: generate a graphical user interface to enable specification of the optical property and the thickness for each of the plurality of material layers.

In some or all examples of the second aspect, the machine-readable instructions, when executed by the one or more processors, can cause the one or more processors to: receive, for each of the at least one multi-layer material, an identification of each of the material layers in the ordered set, and an order of the material layers in the ordered set, via the graphical user interface.

In some or all examples of the second aspect, upon the identification of each of the material layers in the ordered set for one of the at least one multi-layer material, the machine-readable instructions, when executed by the one or more processors, can cause the one or more processors to present a rendered view of the one of the at least one multi-layer material with subsurface scattering generated using the global transfer matrix with the graphical user interface.

Other aspects and features of the present disclosure will become apparent to those of ordinary skill in the art upon review of the following description of specific implementations of the application in conjunction with the accompanying figures.

Figure 1:
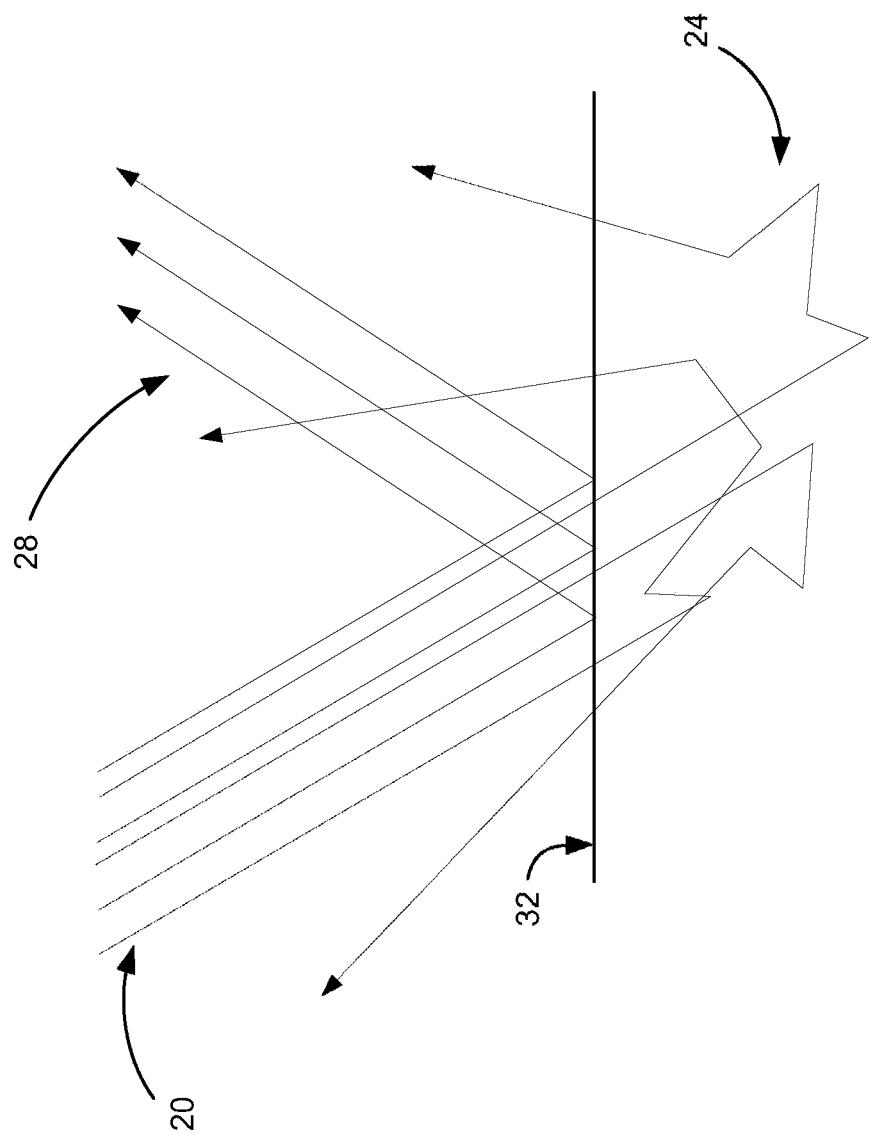
FIG. 1 is a schematic diagram illustrating trajectories either reflecting off of a surface of an object or scattering below the surface of the object.

Unless otherwise specifically noted, articles depicted in the drawings are not necessarily drawn to scale.

DETAILED DESCRIPTION OF EXAMPLE EMBODIMENTS

The present disclosure is made with reference to the accompanying drawings, in which embodiments are shown. However, many different embodiments may be used, and thus the description should not be construed as limited to the embodiments set forth herein. Rather, these embodiments are provided so that this application will be thorough and complete. Wherever possible, the same reference numbers are used in the drawings and the following description to refer to the same elements, and prime notation is used to indicate similar elements, operations or steps in alternative embodiments. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although such functions are illustrated separately for ease of explanation herein. Different devices may have different designs, such that although some devices implement some functions in fixed function hardware, other devices may implement such functions in a programmable processor with code obtained from a machine-readable medium. Lastly, elements referred to in the singular may be plural and vice versa, except wherein indicated otherwise either explicitly or inherently by context.

Prior art solutions do not provide efficient and photorealistic multi-layer subsurface scattering solutions in real-time rendering. Real-time rendering in multi-layer materials is possible by simplification of multi-layers into single layer with diffusion-based methods or using machine learning (ML)-based SSS methods. This results in lost fidelity of the SSS appearance during runtime. Further, slight change of material configurations require re-computations based on the new configurations. The previous computed subsurface scattering effects will no longer be valid due to changes in the material configuration. Still further, given massive combinations of multi-layer materials based on user defined optical properties and thickness for the each layers, current approaches cannot be readily configured to handle all such scenarios.

To overcome the fidelity of multi-layer materials during runtime, the approaches described herein, rather than diffusion-based methods, use a simulated ground truth bidirectional scattering distribution function (BSDF) for a single layer with varying optical properties and thickness which are generated from a MC SSS method to feed into an ML training network. ML training consolidates into latent space serve as "ML trained material library database". The latent space retains the fidelity and accuracy of SSS during runtime.

To overcome the scalability issue, the general approach herein uses a material editor interface that allows a user to input the material properties (optical properties and thickness in some example embodiments) of each material layer of multi-layer materials. The inputted material properties inference the trained ML network to find the corresponding BSDF for each user-defined material layer.

For flexibility, the general approach described herein uses the transfer matrix method (TMM) to consolidate BSDFs of each material layer of a multi-layer material into a single BSDF that minimizes the data footprint, and caches it in storage. Hence, the cached consolidated BSDFs for multi-layer materials will be used during runtime.

Figure 2:
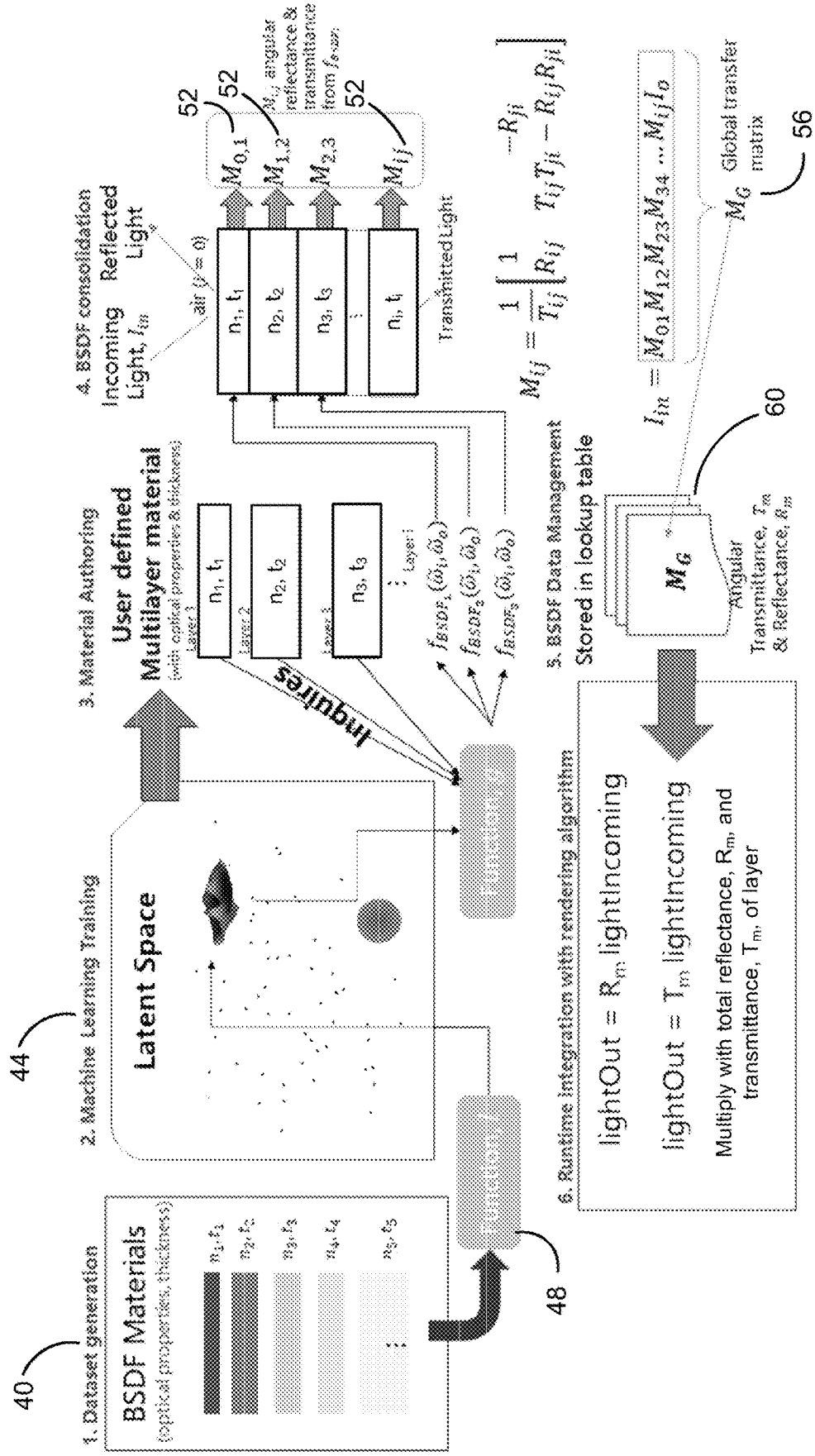
FIGS. 2 and 3 are schematic diagrams showing a general approach for rendering subsurface scattering in accordance with example embodiments described herein.
Figure 3:
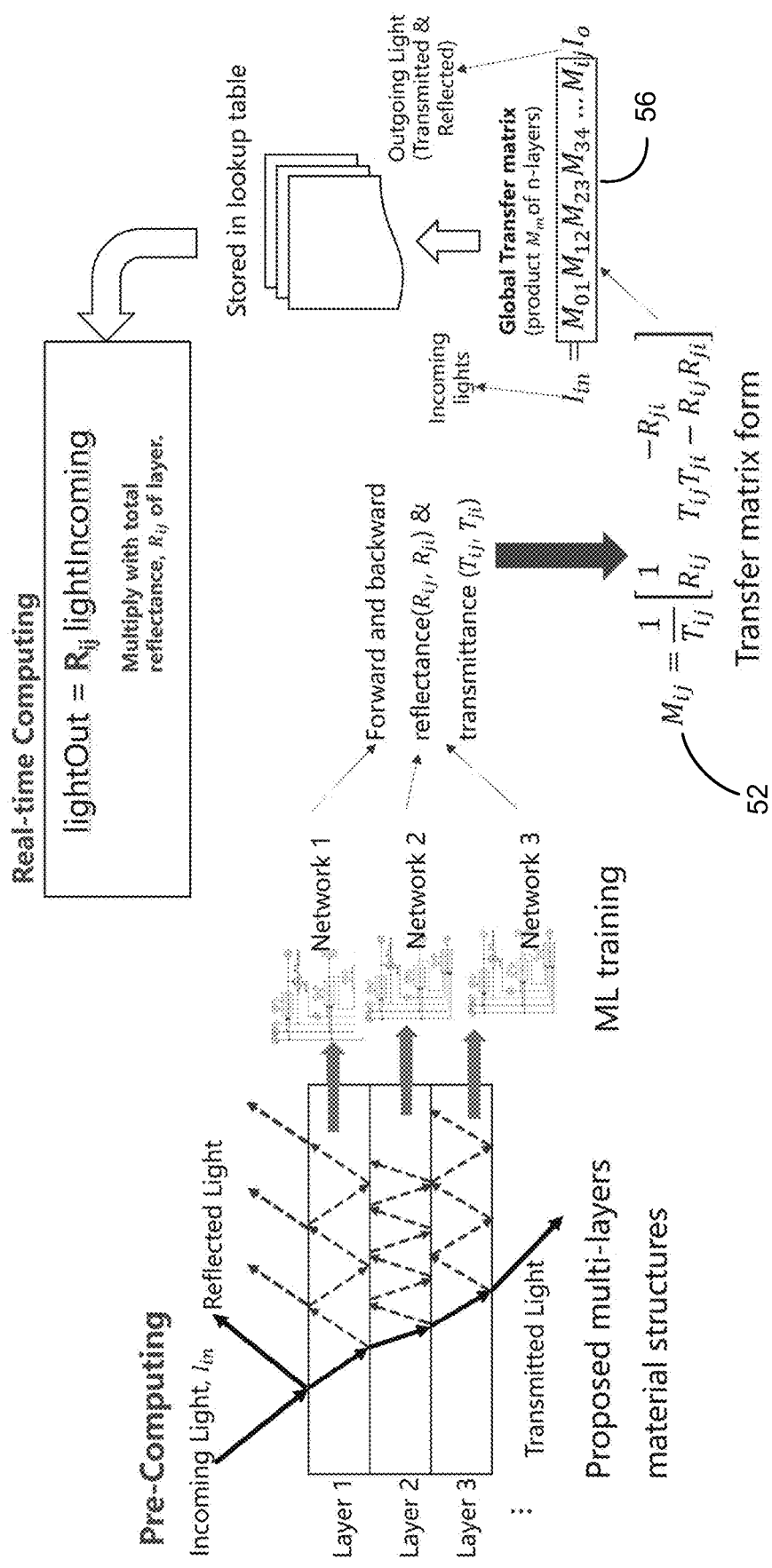

FIGS. 2 and 3 show a general architecture for a method for rendering subsurface scattering in accordance with an embodiment described herein. In the architecture, knowledge of a set of material layers is received and used to generate a latent space for each material layer and a transfer matrix for each adjacent pair of material layers (e.g., layer 1 and layer 2, layer 2 and layer 3, etc.). The transfer matrices of material layers of interest are then combined at runtime to generate subsurface scattering.

Figure 4:
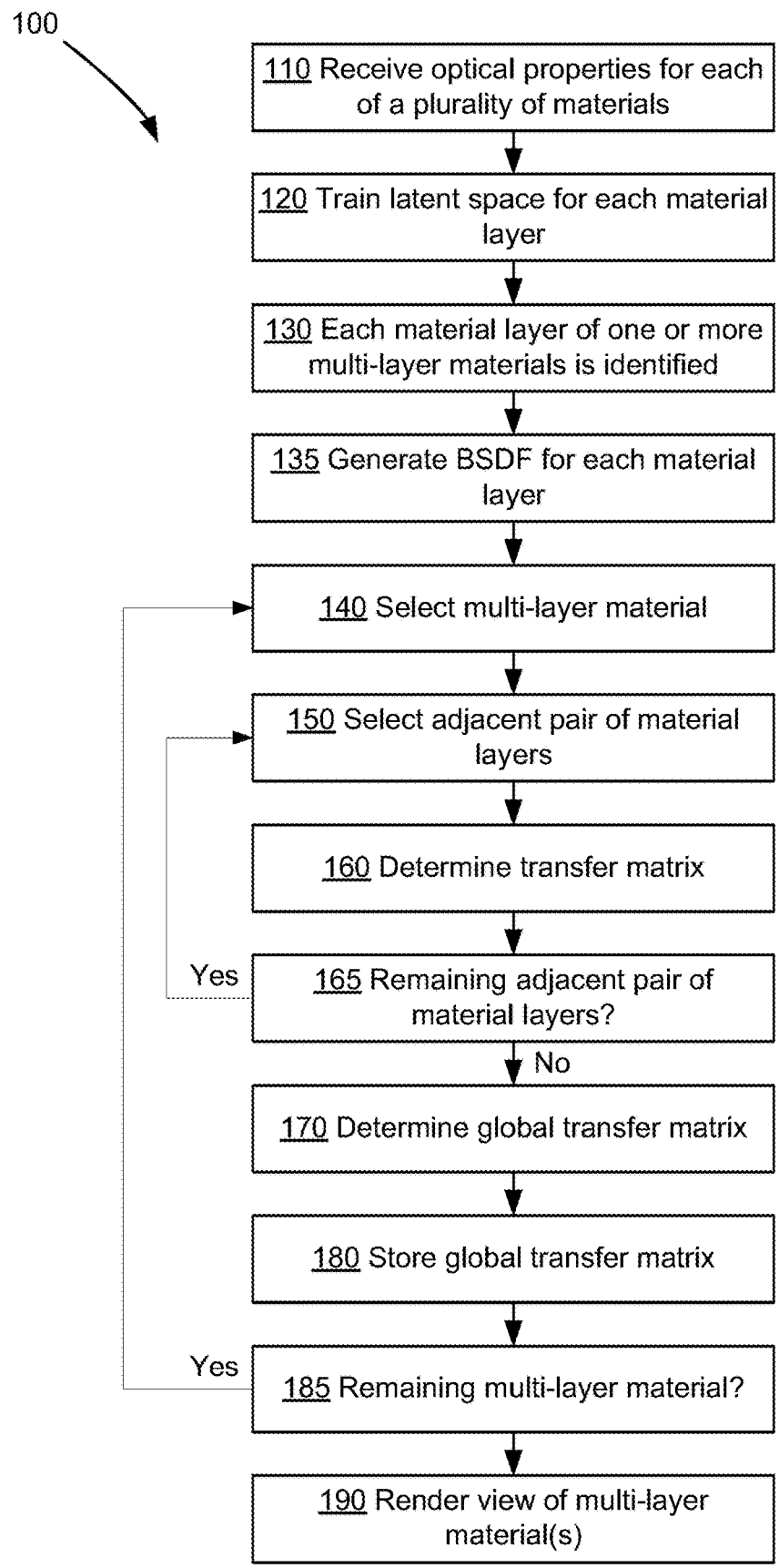
FIG. 4 is a flow chart of a general method for rendering subsurface scattering in accordance with some example embodiments described herein.

Now with reference to FIGS. 2 and 4, a general method 100 for rendering subsurface scattering in accordance with an embodiment will now be described.

A material layer database 40 of the BSDFs for each of a set of material layers is created by receiving one or more optical properties and a thickness for each of a plurality of material layers (110). In order to generate the material layer database, characteristics for each of a set of material layers is received. The characteristics for each of the material layers include one or more optical properties (the refractive index, $n_i$, in this particular embodiment) and the thickness, $t_i$. The set of material layers includes at least any material layers that can be expected to form part of a rendered multi-layer material.

Next, machine learning training is performed on each material layer in the material layer database (120). During ML training, the data for each of the material layers is processed. The goal is to encode and compress the material layer database in a higher-order latent space 44 and generate an inference function 48 to call the BSDF.

Once the ML training is performed, material properties for each layer of one or more multi-layer materials is identified (130). During material authoring, a material editor user interface (UI) enables a user to define material properties of each layer and an order for the layers. The material properties include the optical properties and the thickness. Then, a BSDF for each material layer is generated (135). The inputted material properties enables triggering of the inference function to make inquiries to the trained network (that is, the latent space) to generate a corresponding BSDF for each layer of the multi-layer structure.

Upon determining the BSDF for each layer, a multi-layer material is selected (140), then an adjacent pair of material layers is selected (150). The transfer matrix of the adjacent pair of material layers is determined (160). To consolidate the BSDFs of an adjacent pair of material layers into a single BSDF, the BSDFs are decomposed into bidirectional reflectance distribution functions (BRDFs) and bidirectional transmittance distribution functions (BTDFS) which describe the angular and azimuthal reflectance and transmittance respectively. The BRDFs and the BTDFs are expressed as a transfer matrix form, $M_{ij}$ where i and j are the upper and lower layers, respectively.

It is then determined if there are any remaining adjacent pairs of material layers (165). If there are, the method 100 returns to 150, where a next adjacent pair of material layers is selected.

Once all of the BSDFs in transfer matrix form for adjacent pairs of material layers have been determined, the global transfer matrix for the multi-layer material is determined (165). The product of the transfer matrices of each adjacent pair of material layers is determined to generate the global transfer matrix that represents the consolidated BSDF. Depending on the number of the layer, the global transfer matrix, $M_G$ is the product of all of the transfer matrixes of the layers. Thus, $M_G = M_{01} M_{12} M_{23} M_{34} \ldots M_{ij}$. The single BSDF describes the scattering behavior of the user-defined multi-layer material. The global transfer matrix describes the total radiance (light intensity) transfer between the top layer and the bottom layer of the material inputted via the material editor UI in the form of reflectance and transmittance; i.e., the fraction of light reflected and transmitted.

The global transfer matrix for the user-defined multi-layer material is then cached and stored in memory by the computing system before runtime (180).

If it is determined that there are any remaining multi-layer materials for which the global transfer matrix has not yet been determined (185), the method 100 returns to 150 at which another multi-layer material is selected.

In addition to the BSDFs for each multi-layer material, the BSDF for any single-layer material entered through the material editor UI is also cached and stored in memory.

One or more of the multi-layer materials can then be rendered with subsurface scattering (190). During runtime, the cached BSDFs in memory act as a lookup table for angular and azimuthal reflectance and transmittance when a rendering algorithm computes the outgoing light based on the incoming light directions for the multi-layer materials, as well as the single-layer materials.

Figure 5:
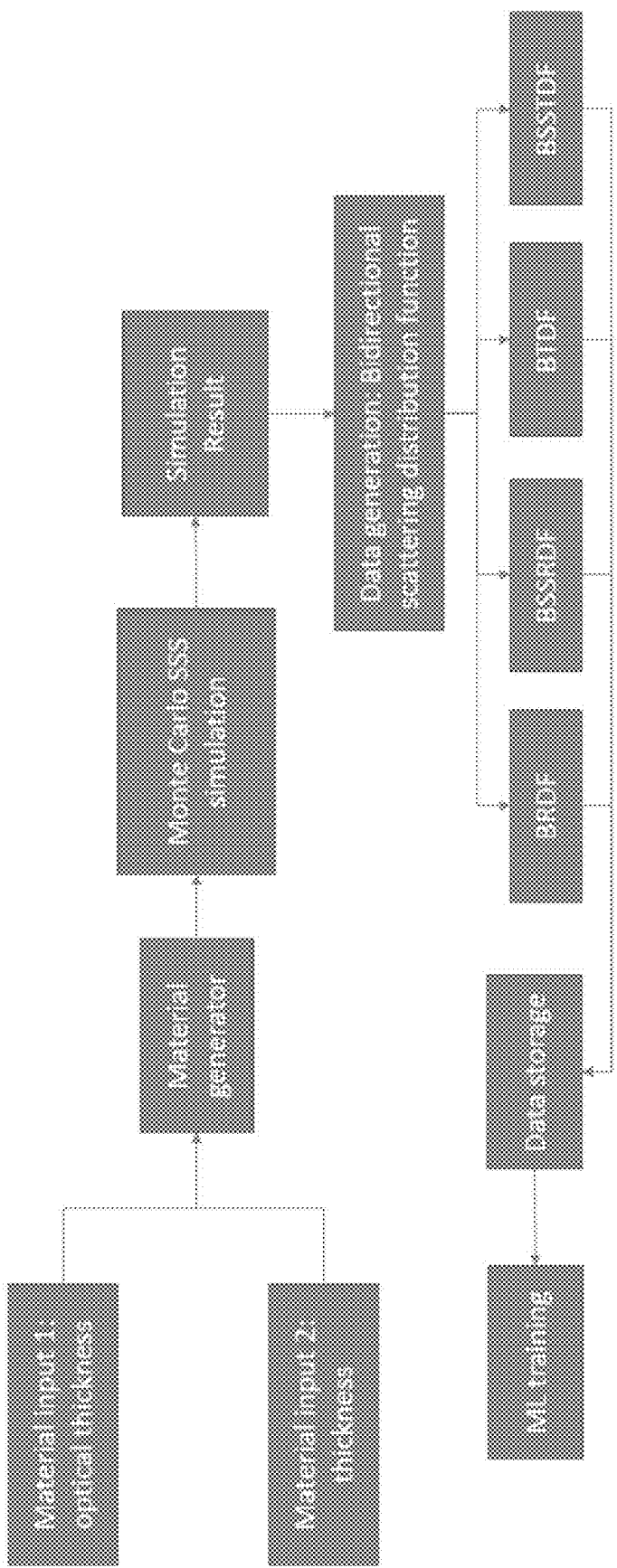
FIG. 5 is a schematic diagram showing a general approach for machine learning training for rendering subsurface scattering in accordance with some example embodiments described herein.

FIG. 5 shows the workflow in some example embodiments for creating the material layer database and performing machine learning on the material layer database entered by the user. During the creation of the material layer database at 110, two material inputs are inputted for each material (i.e., the refractive index and the thickness) in order to perform simulations using a MC SSS framework. The simulation for each material simulates the light interaction with the material and generates the BSDF. This generated BSDF data is further decomposed into a BRDF, a bidirectional subsurface reflectance distribution function (BSSRDF), a BTDF, and a bidirectional subsurface transmittance distribution function (BSSTDF). These functions are stored in the common material layer database format that will use it later for the machine learning training.

Depending of the number of material layers being entered for the multi-layer materials, the process is recursive and generates BSDFs for each material inputted. The machine learning uses commonly available approaches, such as variational autoencoder and decoder and neural processing (NP) to train the material layer database at a higher dimension. The inference function is generated as a result of this process. The training process can be performed multiple times for optimization and to reduce the training loss.

The BSDF for each of the material layers is generated from the ground truth MC SSS method. The BSDF is stored together with the optical properties (i.e., the refractive index in this particular embodiment) and the thickness in the material layer database. This information is used for data tagging during machine learning training.

Figure 6:
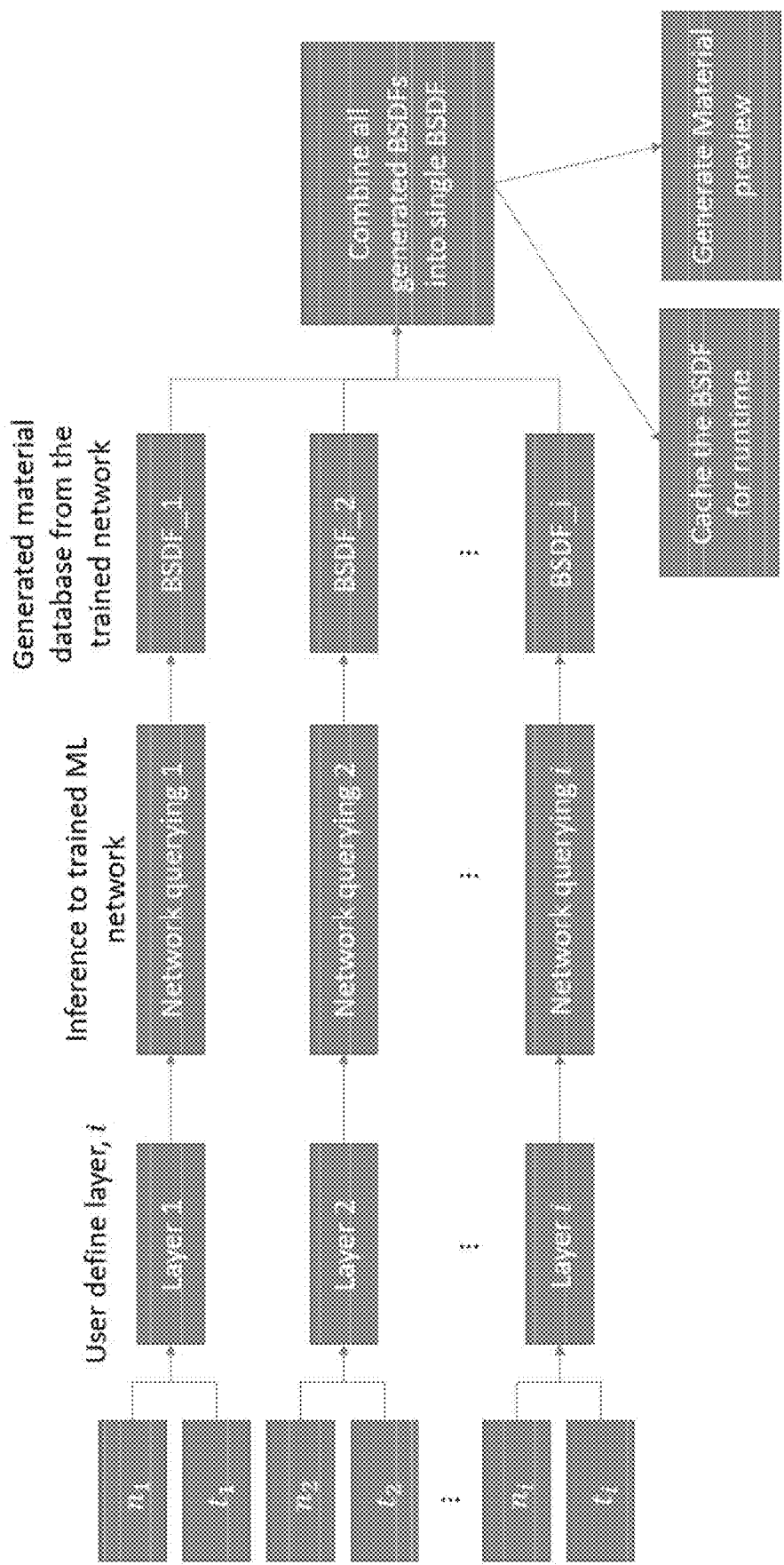
FIG. 6 is a schematic diagram showing pre-runtime and runtime deployment of a system for rendering subsurface scattering in accordance with some example embodiments described herein.

FIG. 6 shows the workflow for pre-runtime and runtime in accordance with some embodiments. During the pre-runtime/runtime deployment stages, inputs received (such as from a user) define the number of layers and the optical properties and thickness for each layer. The system uses these inputs to perform network querying via an inference function. The results of network querying are the corresponding BSDFs for the user-defined layers. To combine these BSDF layers into a single BSDF, the transfer matrix method is used to calculate the radiance transfer for each layer and form a transfer matrix for each scattering component in the BSDF. The material editor UI generates a user preview based on the single BSDF for the inputted multi-layer material. This BSDF is then cached for use at runtime.

Using the approaches described herein, BSDF data is generated using the optical properties and thickness input for single layer materials. This enables the measurement of the scattering properties of multi-layer materials based on defined optical properties that are measured in real life, and enables varying scattering properties with varying thicknesses.

In addition, BSDF data generation is based on the optical properties and thickness input for single layer materials. This enables the measurement of the scattering properties of material layers based on defined optical properties that are measured in real life, and enable the varying of scattering properties with varying thickness. Further, the approach uses constant material scattering properties, rather than measured real-life results for material layers that have inconsistent compositions.

Inference of material properties are based on the optical properties and thicknesses of the material layers. This enables flexible and scalable generation of the BSDF of each layer from an inference network.

The multi-layer material appearance preview provides a quick visual appearance preview of a multi-layer material on the fly.

The general approach combines multiple BSDFs into a single BSDF to represent scattering properties of multi-layer materials during pre-runtime processing. As a result, there is a performance improvement with this approach as a single transfer matrix is used rather than calculating all of the layers separately at runtime with a traditional MC SSS or approximated method.

By using a cached transfer matrix for multi-layer materials at runtime, the computational cost is reduced for determining angular scattering distribution with incoming and outgoing light directions at runtime.

In some embodiments, a material library can be built from the trained neural network that uses measured and/or simulated BSDFs of material layers. Then, create UI to enable users to author the material for simple single layer or multi-layer materials.

The material editor tool can be used to assign multi-layer materials to three-dimensional objects in a model.

Figure 7:
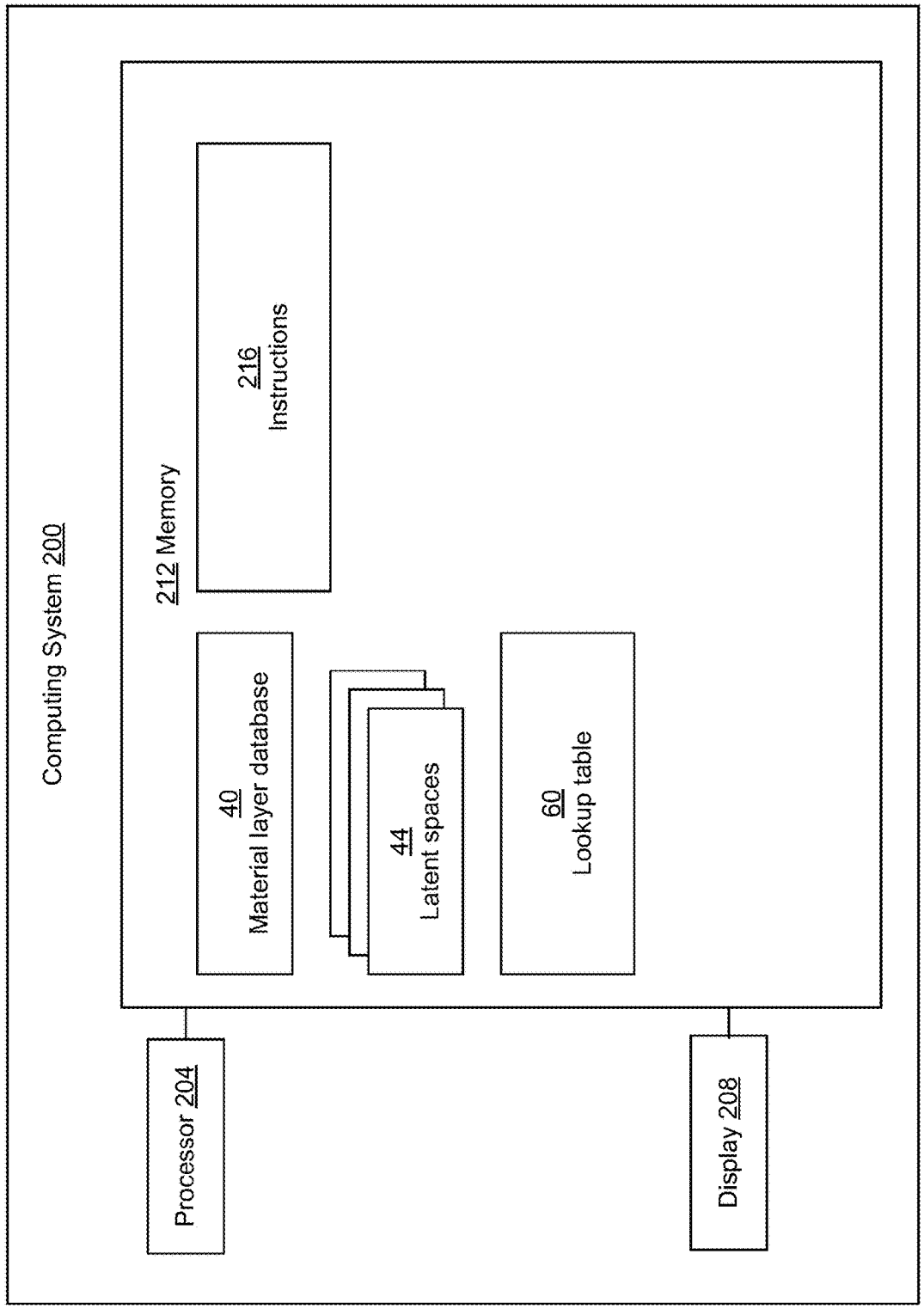
FIG. 7 is a schematic diagram illustrating various physical and logical components of a computing system for rendering subsurface scattering in accordance with some example embodiments described herein.

FIG. 7 shows various physical and logical components of an exemplary computing system 200 for rendering subsurface scattering in accordance with an embodiment of the present disclosure. Although an example embodiment of the computing system 200 is shown and discussed below, other embodiments may be used to implement examples disclosed herein, which may include components different from those shown. Although a single instance of each component of the computing system 200 is shown, there may be multiple instances of each component. The example computing system 200 may be part of, or connected to, a device for rendering three-dimensional views of objects for electronic games, computer-aided design, and other simulations.

The computing system 200 includes one or more processors 204, such as a central processing unit, a microprocessor, an application-specific integrated circuit (ASIC), a field-programmable gate array (FPGA), a dedicated logic circuitry, a tensor processing unit, a neural processing unit, a dedicated artificial intelligence processing unit, or combinations thereof. The one or more processors 204 may collectively be referred to as a processor 204. The computing system 200 may include a display 208 for outputting data and/or information in some applications, but may not in some other applications.

The computing system 200 includes one or more memories 212 (collectively referred to as "memory 212"), which may include a volatile or non-volatile memory (e.g., a flash memory, a random access memory (RAM), and/or a read-only memory (ROM)). The non-transitory memory 212 may store machine-executable instructions for execution by the processor 204. A set of machine-executable instructions 216 defining an application process for rendering subsurface scattering (described herein) is shown stored in the memory 212, which may be executed by the processor 204 to perform the steps of the methods for rendering subsurface scattering described herein. The memory 212 may include other machine-executable instructions for execution by the processor 204, such as machine-executable instructions for implementing an operating system and other applications or functions. Further, the machine-executable instructions 216 can define an application process to generate a graphical user interface for defining material layers and multi-layer materials.

The memory 212 also stores the material layer database 40, the latent spaces 44, and the global transfer matrices in the lookup table 60.

In some examples, the computing system 200 may also include one or more electronic storage units (not shown), such as a solid state drive, a hard disk drive, a magnetic disk drive and/or an optical disk drive. In some examples, one or more datasets and/or modules may be provided by an external memory (e.g., an external drive in wired or wireless communication with the computing system 200) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage. The storage units and/or external memory may be used in conjunction with memory 212 to implement data storage, retrieval, and caching functions of the computing system 200.

The components of the computing system 200 may communicate with each other via a bus, for example. In some embodiments, the computing system 200 is a distributed computing system and may include multiple computing devices in communication with each other over a network, as well as optionally one or more additional components. The various operations described herein may be performed by different computing devices of a distributed system in some embodiments. In some embodiments, the computing system 200 is a virtual machine provided by a cloud computing platform.

Figure 8A:
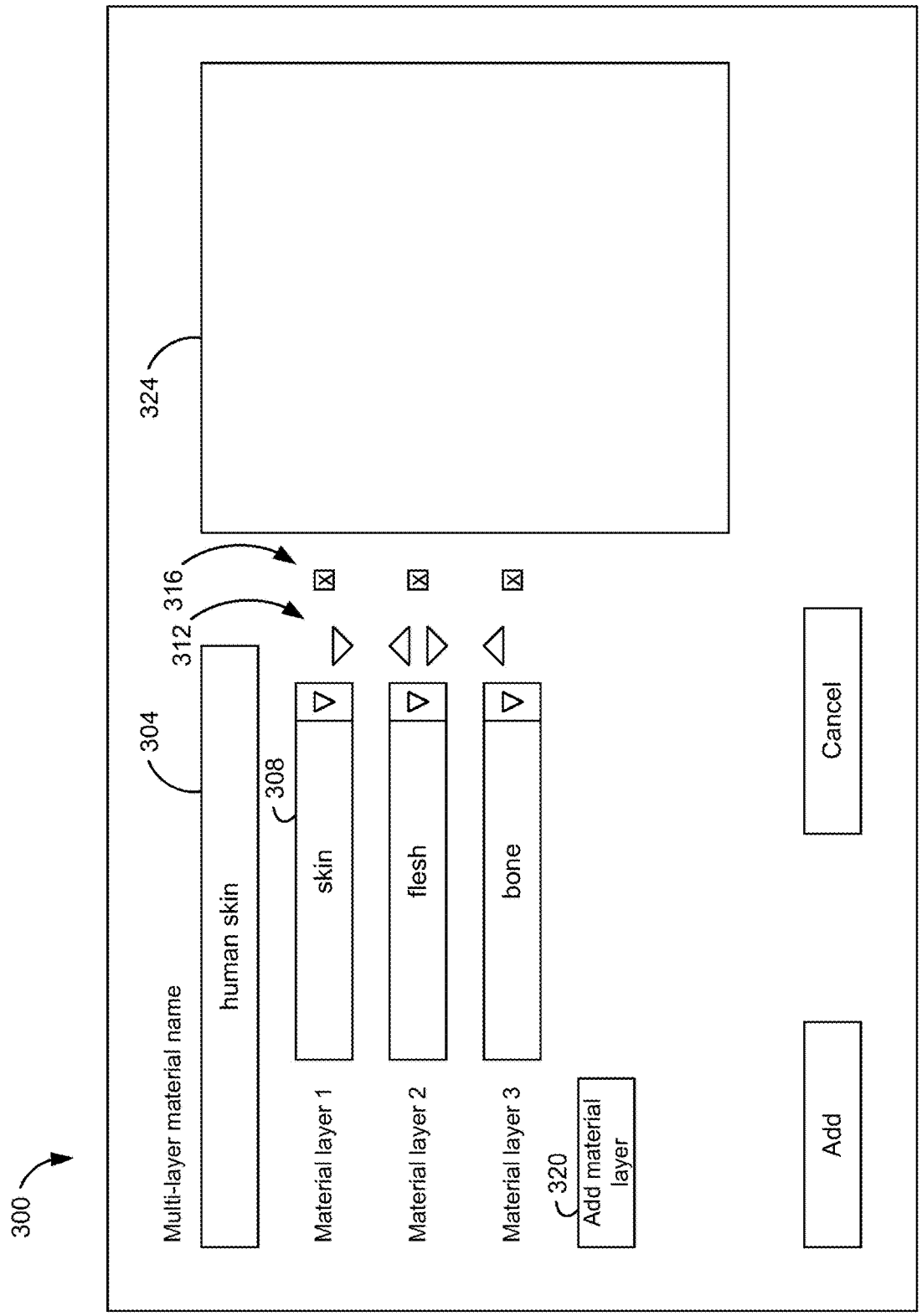
FIG. 8A shows a graphical user interface for enabling a user to specify material layers of a multi-layer material.

FIG. 8A shows an exemplary material design graphical user interface (GUI) 300 that is generated when the processor 204 executes the computer-executable instructions. The material design GUI 300 enables a user to define a multi-layer material. A name field 304 enables specification of a name for the multi-layer material. A set of dropdown selection controls 308 enable identification of defined material layers of the multi-layer material. The material layers may be user defined or defined in any suitable manner. In addition, an option on the dropdown selection controls 308 enables the creation of a new material layer. Order controls 312 enable the reordering of the material layers in the multi-layer material. Layer deletion controls 316 enable deletion of a particular material layer from the multi-layer material. As will be understood, deletion of the material layer in the multi-layer material may not necessarily delete the material layer from the material layer database. An add material layer control 320 enables the addition of a material layer to the multi-layer material.

A preview pane 324 of the material design GUI 300 presents a rendered view of a three-dimensional object of the multi-layer material being defined to enable the user to readily confirm the user's choice(s) visually. The rendered view presented in the preview pane 324 is generated by performing the method 200 and using the resulting global transfer matrix 56. As values in the material design GUI 300 are updated, the method 200 is re-executed for the updated selection(s), and the image presented in the preview pane 324 is updated accordingly.

Figure 8B:
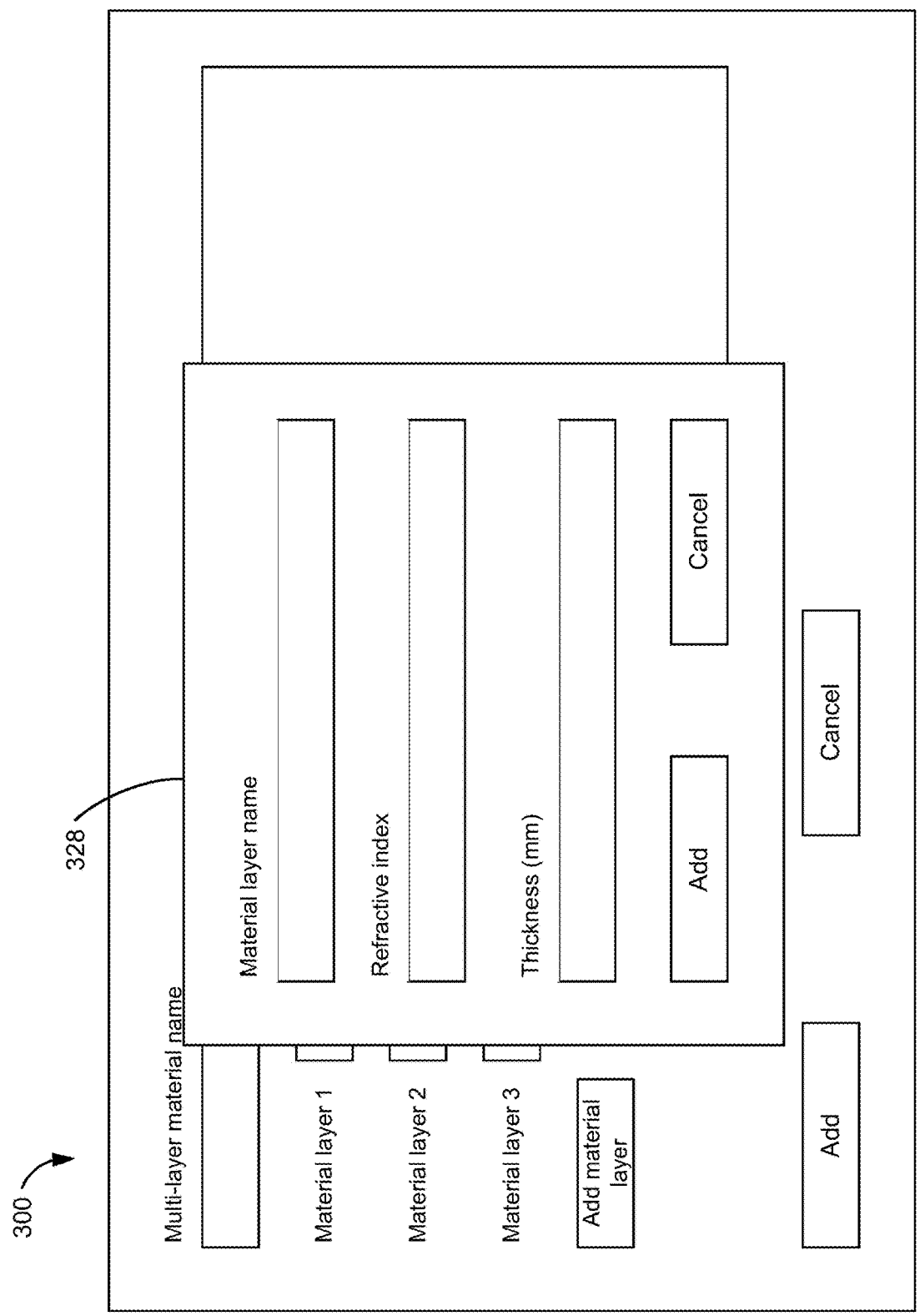
FIG. 8B shows the graphical user interface of FIG. 8A presenting a dialog box for enabling a user to specify characteristics of material layers.

FIG. 8B shows a dialog box 328 of the material design GUI 300 when the specification of a new material layer is selected via one of the dropdown selection controls 308. The dialog box 328 enables the user to name the new material layer, and provide the refractive index and thickness for the new material layer.

The steps (also referred to as operations) in the flowcharts and drawings described herein are for purposes of example only. There may be many variations to these steps/operations without departing from the teachings of the present disclosure. For instance, the steps may be performed in a differing order, or steps may be added, deleted, or modified, as appropriate.

In other embodiments, the same approach described herein can be employed for other modalities.

General

Through the descriptions of the preceding embodiments, the present invention may be implemented by using hardware only, or by using software and a necessary universal hardware platform, or by a combination of hardware and software. The coding of software for carrying out the above-described methods described is within the scope of a person of ordinary skill in the art having regard to the present disclosure. Based on such understandings, the technical solution of the present invention may be embodied in the form of a software product. The software product may be stored in a non-volatile or non-transitory storage medium, which can be an optical storage medium, flash drive or hard disk. The software product includes a number of instructions that enable a computing device (personal computer, server, or network device) to execute the methods provided in the embodiments of the present disclosure.

All values and sub-ranges within disclosed ranges are also disclosed. Also, although the systems, devices and processes disclosed and shown herein may comprise a specific plurality of elements, the systems, devices and assemblies may be modified to comprise additional or fewer of such elements. Although several example embodiments are described herein, modifications, adaptations, and other implementations are possible. For example, substitutions, additions, or modifications may be made to the elements illustrated in the drawings, and the example methods described herein may be modified by substituting, reordering, or adding steps to the disclosed methods.

Features from one or more of the above-described embodiments may be selected to create alternate embodiments comprised of a sub-combination of features which may not be explicitly described above. In addition, features from one or more of the above-described embodiments may be selected and combined to create alternate embodiments comprised of a combination of features which may not be explicitly described above. Features suitable for such combinations and sub-combinations would be readily apparent to persons skilled in the art upon review of the present disclosure as a whole.

In addition, numerous specific details are set forth to provide a thorough understanding of the example embodiments described herein. It will, however, be understood by those of ordinary skill in the art that the example embodiments described herein may be practiced without these specific details. Furthermore, well-known methods, procedures, and elements have not been described in detail so as not to obscure the example embodiments described herein. The subject matter described herein and in the recited claims intends to cover and embrace all suitable changes in technology.

Although the present invention and its advantages have been described in detail, it should be understood that various changes, substitutions and alterations can be made herein without departing from the invention as defined by the appended claims.

The present invention may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. A computer-implemented method for rendering subsurface scattering, comprising:
   receiving an optical property and a thickness for each of a plurality of material layers;
   training a latent space for each of the plurality of material layers;
   generating a global transfer matrix for at least one multi-layer material, each of the at least one multi-layer material including an ordered set of material layers selected from the plurality of material layers, by:
      determining a transfer matrix for each adjacent pair of material layers in the ordered set of material layers using the latent space for each material layer in the adjacent pair of material layers, the transfer matrix describing angular and azimuthal reflectance and angular and azimuthal transmittance; and
      determining the global transfer matrix as a product of the transfer matrices of each adjacent pair of material layers; and
   storing the transfer matrix for each of the at least one multi-layer material in memory of a computing system.

2. The computer-implemented method for rendering subsurface scattering, further comprising:
   rendering subsurface scattering in a rendered image using at least one of the transfer matrices.

3. The computer-implemented method of claim 1, wherein the optical property is a refractive index.

4. The computer-implemented method of claim 1, further comprising:
   determining a bidirectional scattering distribution function for each of the plurality of material layers using the optical property and the thickness thereof,
   wherein the training is performed using the bidirectional scattering distribution function.

5. The computer-implemented method of claim 1, further comprising:
   determining a bidirectional reflectance distribution function and a bidirectional transmittance distribution function for each of the plurality of material layers; and
   storing the bidirectional reflectance distribution function and the bidirectional transmittance distribution function for each of the plurality of material layers in memory,
   wherein the determining of the transfer matrix for each adjacent pair of material layers is based on the bidirectional reflectance distribution function and the bidirectional transmittance distribution function for each of the material layers in the adjacent pair.

6. The computer-implemented method of claim 1, wherein the bidirectional scattering distribution function is determined using a Monte Carlo subsurface scattering method.

7. The computer-implemented method of claim 6, wherein the Monte Carlo subsurface scattering method is a ground truth Monte Carlo subsurface scattering method.

8. The computer-implemented method of claim 1, wherein during the receiving of the optical property and the thickness of each of the plurality of material layers, a graphical user interface is generated to enable specification of the optical property and the thickness for each of the plurality of material layers.

9. The computer-implemented method of claim 8, further comprising:
   receiving, for each of the at least one multi-layer material, an identification of each of the material layers in the ordered set, and an order of the material layers in the ordered set, via the graphical user interface.

10. The computer-implemented method of claim 9, wherein, upon the identification of each of the material layers in the ordered set for one of the at least one multi-layer material, the graphical user interface presents a rendered view of the one of the at least one multi-layer material with subsurface scattering generated using the global transfer matrix.

11. A computing system for rendering subsurface scattering, the computing system comprising:
one or processors;
a memory storing machine-readable instructions that, when executed by the one or more processors, cause the one or more processors to:
receive an optical property and a thickness for each of a plurality of material layers;
train a latent space for each of the plurality of material layers;
generate a global transfer matrix for at least one multi-layer material, each of the at least one multi-layer material including an ordered set of material layers selected from the plurality of material layers, by:
determining a transfer matrix for each adjacent pair of material layers in the ordered set of material layers using the latent space for each material layer in the adjacent pair of material layers, the transfer matrix describing angular and azimuthal reflectance and angular and azimuthal transmittance; and
determining the global transfer matrix as a product of the transfer matrices of each adjacent pair of material layers; and
store the transfer matrix for each of the at least one multi-layer material in memory of a computing system.

12. The computing system for rendering subsurface scattering of claim 11, wherein the machine-readable instructions, when executed by the one or more processors, cause the one or more processors to:
generate subsurface scattering in a rendered image using at least one of the transfer matrices.

13. The computing system for rendering subsurface scattering of claim 11, wherein the optical property is a refractive index.

14. The computing system for rendering subsurface scattering of claim 11, wherein the machine-readable instructions, when executed by the one or more processors, cause the one or more processors to:
determine a bidirectional scattering distribution function for each of the plurality of material layers using the optical property and the thickness thereof,
wherein the training is performed using the bidirectional scattering distribution function.

15. The computing system for rendering subsurface scattering of claim 11, wherein the machine-readable instructions, when executed by the one or more processors, cause the one or more processors to:
determine a bidirectional reflectance distribution function and a bidirectional transmittance distribution function for each of the plurality of material layers; and
store the bidirectional reflectance distribution function and the bidirectional transmittance distribution function for each of the plurality of material layers in memory,
wherein the determining of the transfer matrix for each adjacent pair of material layers is based on the bidirectional reflectance distribution function and the bidirectional transmittance distribution function for each of the material layers in the adjacent pair.

16. The computing system for rendering subsurface scattering of claim 11, wherein the bidirectional scattering distribution function is determined using a Monte Carlo subsurface scattering method.

17. The computing system for rendering subsurface scattering of claim 16, wherein the Monte Carlo subsurface scattering method is a ground truth Monte Carlo subsurface scattering method.

18. The computing system for rendering subsurface scattering of claim 11, wherein the machine-readable instructions, when executed by the one or more processors, cause the one or more processors to:
generate a graphical user interface to enable specification of the optical property and the thickness for each of the plurality of material layers.

19. The computing system for rendering subsurface scattering of claim 18, wherein the machine-readable instructions, when executed by the one or more processors, cause the one or more processors to:
receive, for each of the at least one multi-layer material, an identification of each of the material layers in the ordered set, and an order of the material layers in the ordered set, via the graphical user interface.

20. The computing system for rendering subsurface scattering of claim 19, wherein, upon the identification of each of the material layers in the ordered set for one of the at least one multi-layer material, the machine-readable instructions, when executed by the one or more processors, cause the one or more processors to present a rendered view of the one of the at least one multi-layer material with subsurface scattering generated using the global transfer matrix with the graphical user interface.

\* \* \* \* \*